United States Patent [19]

Miles

[11] Patent Number: 4,749,598

[45] Date of Patent: Jun. 7, 1988

[54] POLY(ARYLENE SULFIDE) COMPOSITION AND PROCESS

[75] Inventor: Dawn E. Miles, Bartlesville, Okla.

[73] Assignee: Phillips Petroleum Company, Bartlesville, Okla.

[21] Appl. No.: 16,315

[22] Filed: Feb. 19, 1987

[51] Int. Cl.$^4$ .................... B05D 3/02; C08K 3/36
[52] U.S. Cl. ................... 427/374.1; 524/492; 524/493; 524/609; 524/407; 524/423; 524/449; 524/448; 524/452; 524/430; 524/431; 524/432; 524/424; 524/425; 427/388.1; 427/398.1; 427/392.7; 264/141; 264/211; 264/331.11; 264/328.16; 264/328.18; 264/272.11
[58] Field of Search ............. 524/492, 493, 609, 452, 524/407, 424, 423; 264/331.11, 141, 211, 328.16, 328.18, 272.11; 427/374.1, 388.1, 398.1, 397.7

[56] References Cited

U.S. PATENT DOCUMENTS

| | | | |
|---|---|---|---|
| 3,354,129 | 11/1967 | Edmonds, Jr. et al. | |
| 3,894,983 | 7/1975 | Higbee | |
| 4,147,819 | 4/1979 | Hukumoto et al. | 427/388.1 |
| 4,247,598 | 1/1981 | Blackwell | |
| 4,337,182 | 6/1982 | Needham | 524/609 |
| 4,370,292 | 1/1983 | Yanase et al. | 525/537 |
| 4,395,509 | 7/1983 | Blackwell | 524/609 |
| 4,395,512 | 7/1983 | Kubota et al. | 524/425 |
| 4,396,658 | 8/1983 | Nettes et al. | 525/537 |
| 4,436,865 | 3/1984 | Beever | 524/493 |
| 4,504,551 | 3/1985 | Leland | |
| 4,514,588 | 4/1985 | Beever et al. | 525/90 |
| 4,548,971 | 10/1985 | Mortinovich et al. | |

OTHER PUBLICATIONS

Reynolds Chemicals Data Sheet (Reynolds Metals Co., Apr. 1980), The Condensed Chemical Dictionary, 9th ed., (Hawley, 1977, p. 773).
The Encyclopedia of Chemistry, 3rd ed., (Hampl & Hawley, 1973, pp. 1001–1002).
Encyclopedia of Chemical Technology, 3rd ed., (Kirk-Othmer, 1982, pp. 763, 776, 808, 846, 850, 851 & 852).
Harbison Walker Refractories, Data Sheet on Fused Silica Resin Fillers, Including GP-7I and GP-7I SN5.
Illinois Minerals Company, Data Sheet on Amorphous Silica, Bulletin 203, Including IMSIL A-10, (see 7th page).

*Primary Examiner*—John C. Bleutge
*Assistant Examiner*—David W. Woodward
*Attorney, Agent, or Firm*—Lynda S. Jolly

[57] ABSTRACT

The surface smoothness and adhesion to metal of poly(arylene sulfide) is improved by the addition of an effective amount of a silica composition.

29 Claims, 1 Drawing Sheet

POLY(ARYLENE SULFIDE) COMPOSITION AND PROCESS

FIELD OF THE INVENTION

This invention relates to poly(arylene sulfide) compositions and the preparation thereof. Other aspects of this invention relate to the use of poly(arylene sulfide) compositions in molding, encapsulating, and coating and the articles produced thereby. More particularly this invention relates to improving the surface smoothness and metal adhesion characteristics of poly(arylene sulfide) compositions.

BACKGROUND OF THE INVENTION

Poly(arylene sulfide) polymers are engineering thermoplastics that have excellent heat resistance and are widely employed in various field of applications. Some specialized applications require the polymers used therein to have certain qualities such as good surface smoothness and/or good metal adhesion. Poly(arylene sulfide) polymers produced by conventional methods do not have good surface smoothness and good metal adhesion and therefore are not commercially useful in applications requiring those qualities. It is known to use silica as a filler or a flow improver for poly(arylene sulfide) as disclosed in U.S. Pat. Nos. 4,247,598 and 4,395,512. However, the fillers heretofore known to be useful in combination with poly(arylene sulfide) do not impart improved surface smoothness or metal adhesion. In some applications that require good metal adhesion poly(arylene sulfide) can be used if the metal undergoes a separate step to pre-etch or base coat the metal, but this does not improve surface smoothness of the poly(arylene sulfide).

It would be beneficial if the surface smoothness and metal adhesion of poly(arylene sulfide) polymers could be improved without detrimentally affecting other physical properties.

OBJECTS OF THE INVENTION

It is an object of the present invention to provide a process for improving the surface smoothness and/or metal adhesion of poly(arylene sulfide) polymers. It is a further object of the present invention to provide poly(arylene sulfide) polymers having improved surface smoothness and metal adhesion. It is yet a further object of the present invention to provide articles and a process for producing articles of poly(arylene sulfide) polymers having improved surface smoothness and metal adhesion. It is yet a further object of the present invention to provide poly(arylene sulfide) with acceptable physical properties and improved surface smoothness and metal adhesion.

SUMMARY OF THE INVENTION

Figure 1:
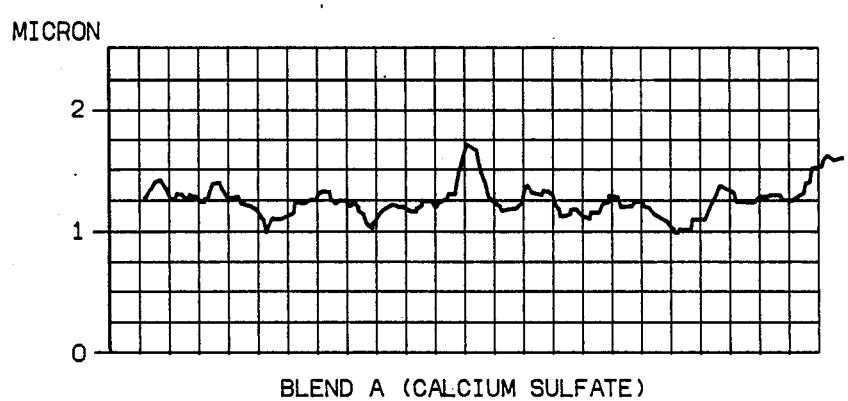
FIG. 1 demonstrates the surface contour of two flat articles made from two different polymer compositions. The polymer composition according to the present invention, Blend B with silica fume, has improved surface smoothness when compared to a conventional polymer, Blend A with calcium sulfate.
Figure 1:
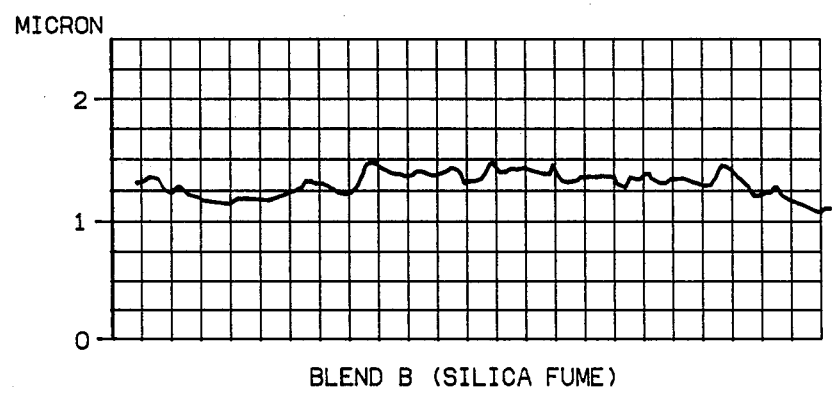

I have discovered that poly(arylene sulfide) compositions of improved surface smoothness and metal adhesion are made by admixing an effective amount of silica fume (fume silica) of relatively high bulk density with a poly(arylene sulfide). These compositions are used in making articles having improved surface smoothness and/or metal adhesion.

BRIEF DESCRIPTION OF THE INVENTION

I have unexpectedly discovered that poly(arylene sulfide) compositions of improved surface smoothness and metal adhesion are made by admixing a poly(arylene sulfide) polymer with an amorphous silica fume of relatively high bulk density. This silica fume is a waste product from the making of silicon used for example in the production of silicon-aluminum alloys.

I have discovered that this particular type of silica, when mixed with poly(arylene sulfide) polymers, unexpectedly improves the surface smoothness and metal adhesion or adherence of those polymers.

This particular silica that improves the surface smoothness and metal adhesion of poly(arylene sulfide) polymers is the white smoke by-product from the manufacturing of silicon from quartz (natural silicon dioxide) for use in silicon-aluminum alloys and is generally called silica fume. Reynolds Chemicals, the supplier of this silica fume useful in my invention, has called this type of silica fume a Fumed Amorphous Silica. However, the preparation of this particular silica fume is not according to the general method of preparing what is known generally as fumed silica.

Fumed silica is generally made by the reaction of a silane tetrahalide, oxygen, and hydrogen. In contrast, the silica fume so effective in my invention is a by-product from the manufacturing of silicon (for silicon-aluminum alloys) and rather is vaporized from quartz in a furnace. This vaporized silica, to avoid being expelled into the atmosphere, is caught in a bag filter so as to avoid atmospheric pollution. In the past this silica fume was merely dumped to waste, but in recent years the cement industry has found it to be an economical filler and presently is the main commercial outlet for this silica fume.

Fumed silica and silica fume are quite different. Fumed silica does not impart surface smoothness and metal adhesion properties to poly(arylene sulfide) compositions.

Though the particle size range and impurities contents of fumed silica and by-product silica fume made by these two different processes may overlap, yet the bulk density of each is definitely different. The bulk density of conventional fumed silica is less than 5 pounds per cubic foot, whereas the by-product silica fume so unexpectedly useful in my invention is characterized by a bulk density greater than 5 pounds per cubic foot.

DETAILED DESCRIPTION OF THE INVENTION

The amount of silica fume incorporated into my compositions, required to impart surface smoothness and metal adhesion properties to the poly(arylene sulfide) compositions, will vary depending upon the application. The amount of silica fume used in the poly(arylene sulfide) compositions will generally be within the range of about 15 to about 70 weight percent silica fume based on the total weight of the composition. When a smooth surface is desired, the preferred range of silica fume will fall within the range of about 30 to 60 weight percent, more preferably, about 50 weight percent based on the total weight of the composition. When good metal adhesion is desired, the preferred amount of silica fume will fall within the range of about 15 to 35 weight percent, more preferably about 25 weight percent based on the total weight of the composition.

Certain applications require polymer compositions of improved strength. The polymer compositions used in these applications preferably have about 5 to 40 weight percent reinforcing inorganic fiber, about 25 to 80 weight percent poly(arylene sulfide), and about 15 to 65 weight percent silica fume based on the total weight of the composition. More preferably these compositions will have about 15 to 30 weight percent reinforcing inorganic fiber, about 30 to 70 weight percent poly(arylene sulfide), and 15 to 50 weight percent silica fume based on the total weight of the composition.

The bulk density of the silica fume generally will fall within the range of 5 to 50 pounds per cubic foot. It is preferred that the bulk density of the silica fume used according to the present invention be within the range of about 10 to 30 pounds per cubic foot. More preferably about 20 pounds per cubic foot.

According to the present invention, it is preferred that the particle size of the silica fume be within the range of about 0.01 to 10 microns, more preferably about 0.1 to 5 microns. It is also preferred that pH of the silica fume be within the range of 3.5 to 6, preferably 4 to 5.

A typical silica fume used in the present invention will have a typical analysis in weight percents of about 98% $SiO_2$, 1% carbon, 0.01% $Fe_2O_3$, 0.1% CaO, 0.1% $Al_2O_3$, 0.2% MgO, 0.01% MnO, 0.04% PbO, 0.3% K, 0.1% Na, and 0.05% S.

For the purposes of this disclosure and the appended claims the term poly(arylene sulfide) is intended to designate arylene sulfide polymers. Uncured or partially cured poly(arylene sulfide) polymers whether homopolymer, copolymer, terpolymer, and the like, or a blend of such polymers, can be used in the practice of the present invention. The uncured or partially cured polymer is a polymer the molecular weight of which can be increased by either lengthening of a molecular chain or by cross-linking or by combination of both by supplying thereto sufficient energy, such as heat (optionally in the presence of oxygen). Suitable poly(arylene sulfide) polymers include, but are not limited to, those described in U.S. Pat. No. 3,354,129, incorporated by reference herein.

Poly(arylene sulfide) of the present invention can be represented by repeating units of the structural formula:

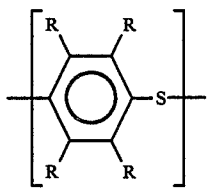

wherein R is selected from the group consisting of hydrogen and alkyl radicals having 1 to 4 carbon atoms.

Poly(arylene sulfide) of the present invention can be branched by the addition of a branching agent such as a trihalobenzene. Branching agents incorporated into the polymer chain can be represented by units of the formula:

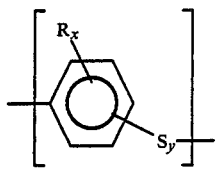

wherein R is defined as above, x is $\leq 3$, y is $\geq 2$, and $x+y=5$.

Some examples of poly(arylene sulfide) suitable for the purposes of the present invention include poly(2,4-tolylene sulfide), poly(4,4'-biphenylene sulfide), and poly(phenylene sulfide). Because of its availability and desirable properties (such as high chemical resistance, nonflammability, and high strength and hardness) poly(phenylene sulfide) is the presently preferred poly(arylene sulfide).

Poly(arylene sulfide) compositions according to the present invention are very useful in applications that require a very smooth surface such as reflective surfaces used in lighting. Poly(arylene sulfide) compositions made according to the present invention are also very useful in applications that require good adhesion to metal such as mechanical parts and electronic components. The compositions of the present invention containing silica fume and poly(arylene sulfide) are particularly useful in extrusion applications that require either good metal adhesion or smooth surfaces.

Typical applications that requires poly(arylene sulfide) compositions of improved surface smoothness include for example the reflector surfaces of head lamps for automobiles, street lamps, and flashlights, etc.

Typical applications that require poly(arylene sulfide) compositions having good metal adhesion include applications in coating, encapsulation, and molding. Useful metal substrates that can be coated or encapsulated according to this invention encompass those metals and metal alloys that can be heated without damage or deformation at the temperatures required to melt and/or cure the applied compositions. Preferably, the metals are selected from copper, gold, silver, aluminum, chromium, titanium, iron, and steels, such as chromium plated steels, carbon steels, and stainless steels, and the like, and alloys thereof.

Preparation of the metal surfaces to be coated or encapsulated generally only consists of cleaning to remove any dirt, grease, and scale that can be present.

According to the present invention entire metal components or sections thereof can be encapsulated in the poly(arylene sulfide) composition of the present invention. This encapsulation is achieved by flowing the composition of this invention as a melt in a mold over the section to be encapsulated while, if required, protecting other sections such as connecting leads, from being coated. The molten composition is allowed to solidify in the mold and then the encapsulated component is removed from the mold.

Typical mechanical parts requiring the adherence of polymer compositions include for example switches; bearings; and parts of valves, meters, and pumps; etc.

When an electrical component is encapsulated the encapsulation steps are generally carried out by injecting the composition of this invention into the mold containing the electrical elements. The temperature for this step is partially based on the electrical component being encapsulated but it will be sufficiently above the melting point of the poly(arylene sulfide) to allow adequate flow of the composition into the mold and around the electrical element or elements. This temperature will be preferably within the range of about 560°-675° F.

Although the invention is not limited thereto the viscosity of the composition used for encapsulation of active components should not exceed about 800 poise. Encapsulation of active electronic components with compositions having viscosities in excess of about 800 poise can cause damage to the components. It is contemplated that the viscosity of the composition will generally range from about 150 to about 500 poise for active components other than very delicate components such as, for example, integrated circuits with wire leads. With respect to very delicate components such as, for example integrated circuits with wire leads the viscosity of the encapsulation composition should be below about 150 poise. Encapsulation of integrated circuits with compositions any higher in viscosity may cause wire wash (i.e., breaking of the wires of the integrated circuit). It is contemplated that the viscosity of the composition for the encapsulation of such integrated circuits and the like will generally range from about 75 to about 150 poise.

Although viscosity of the composition depends on a number of factors, to obtain composition viscosities below about 800 poise the viscosity of the poly(arylene sulfide) contemplated in encapsulation of active components should generally not exceed about 130 poise. It is contemplated that the viscosity of the poly(arylene sulfide) will, in most applications, range up to about 70 poise. To obtain composition viscosities within the desired range for delicate active components such as, for example, integrated circuits with wire leads the viscosity of the poly(arylene sulfide) should generally be less than about 25 poise.

Although the invention is not limited thereto the viscosity of the composition used for encapsulation of passive components should not exceed about 1200 poise. Encapsulation of passive electronic components with compositions having viscosities in excess of about 1200 poise may cause damage to the components. It is contemplated that the viscosity of the composition will generally range from about 500 to about 800 poise.

To obtain composition viscosities within the desired ranges the viscosity of the poly(arylene sulfide) contemplated in encapsulation of passive components should not exceed about 300 poise. It is contemplated that the viscosity of the poly(arylene sulfide) will generally range from about 190 to about 300 poise.

The viscosities mentioned above are determined on a capillary rheometer at 650° F. and at a shear rate of 1000 sec$^{-1}$.

In accordance with this invention some electronic components are required to be encapsulated in an electrically insulating material such as poly(arylene sulfide). Electronic components useful in this invention such as, but are not limited to, light sockets, lamp sockets capacitors, resistors, resistor networks, integrated circuits, transistors, diodes, triodes, thyristors, coils, varistors, connectors, condensers, transducers, crystal oscillators, fuses, rectifiers, power supplies, and microswitches.

The definition of each of the above-identified electronic components is similarly intended to be broad and comprehensive. The term integrated circuit, for example, is intended to include, but is not limited to,
large scale integrated circuits,
TTL (transistor transistor logic),
hybrid integrated circuits,
linear amplifiers
operational amplifiers,
instrumentation amplifiers,
isolation amplifiers,
   multipliers and dividers,
log/antilog amplifiers,
RMS-to-DC converters,
voltage references,
transducers,
conditioners,
instrumentation,
digital-to-analog converters,
analog-to-digital converters,
voltage/frequency converters,
synchro-digital converters,
sample/track-hold amplifiers,
CMOS switches and multiplexers,
data-acquisition subsystems,
power supplies,
memory integrated circuits,
microprocessors,
and so on.

In addition to the poly(arylene sulfide) and silica fume, the composition can also include, if desired, other materials such as, but not limited to, fillers, reinforcements, processing aids, flow improvers, additives, pigments, mold release agents, etc. Examples of such materials include, but are not limited to, talc; silica; clay; alumina; mica; diatomaceous earth; carbon black; metal sulfates; metal hydroxides; polyethylene; zinc stearate; metal carbonates such as calcium carbonate, magnesium carbonate, and zinc carbonate; metal oxides such as titanium dioxide, aluminum oxide, zinc oxide, iron oxide; and chromium oxide; and inorganic fibers such as asbestos, glass, and carbon.

The polymer compositions of the present invention can be prepared by uniformly blending or compounding the components together with the optional additives followed by pelletizing by use of an extruder or the like.

It is preferred that the poly(arylene sulfide) thermoplastic compositions be compounded by melt mixing at temperatures and pressures within the ranges of 568° to 700° F. and 0 to 1800 psig.

The poly(arylene sulfide) compositions of the present invention prepared in the above-described manner can be fabricated into shaped articles by conventional molding methods such as injection molding, rotational molding, compression molding, and the like without particular limitations in the method of molding.

One preferred method of molding comprises
(a) supplying to a mold a measured amount of a thermoplastic material comprising poly(arylene sulfide) and silica fume wherein the amount of said silica fume is sufficient to improve at least one property selected from the group consisting of surface smoothness and adhesion to metal;
(b) heating the mold to fuse the powdered thermoplastic material; and
(c) cooling the mold to cause the fused thermoplastic material to solidify resulting in a molded article of improved properties.

Another preferred molding process comprises
(a) supplying to a mold a measured amount of a molten thermoplastic material comprising poly(arylene sulfide), and silica fume wherein the amount of a said silica fume is sufficient to improve at least one property selected from the group consisting of surface smoothness and adhesion to metal; and (b) cooling the mold to cause the molten thermoplastic material to solidify resulting in a molded article of improved properties.

Injection molding by standard procedures is a more preferred method of preparing encapsulated and non-encapsulated articles.

EXAMPLES

The following are examples illustrating the present invention. Particular materials employed, species, and conditions are intended to be further illustrative of this invention and not limitative of the reasonable scope thereof.

EXAMPLE I

The following were preblended and mixed in a Henchel high intensity Mixer, and identified as Blend 1, 62.6 weight percent fused silica (Fused Silica Powder from Harbison Walker Refractories, Pittsburg, PA identified as GP7I SN5, bulk density 63.6 lb/cu. ft., particle size distribution between about 40 and 1 micron with an average particle size of about 10 microns), 34.4 weight percent of an uncured neat poly(phenylene sulfide) as prepared according to the general procedure disclosed in U.S. Pat. No. 3,354,129 (Extrusion rate 120 to 180 grams per 10 minutes as determined by Ryton ® analytical method 7914-B22 published by Phillips Petroleum Company, Apr. 12, 1979, revised Aug. 18, 1982), 1 weight percent carbon black (N110 carbon black from Phillips Petroleum Company), 1 weight percent silane A-189 (organo silane from Union Carbide), and 1 weight percent zinc oxide (French Process zinc oxide from Pacific Smelting Corp.) to equal a total of 100%.

The 2nd composition, identified as Blend 2, is the same as Blend 1 except that 31.3 weight percent of the fused silica as described above, was replaced with 31.3 weight percent silica fume (Fumed Amorphous Silica from Reynolds Metal Company, Little Rock, Ark. identified as RS-1, bulk density 21 lb/cu. ft., particle size distribution between about 2 and 0.1 microns with a median or average particle size of 0.4 microns, pH 4.5).

The 3rd composition, identified as Blend 3, is the same as Blend 1 except that all the fused silica was replaced with 62.6 weight percent of the silica fume. (Fumed Amorphous Silica from Reynolds Metal Company, Little Rock, Ark. identified as RS-1, bulk density 21 lb/cu. ft., particle size distribution between about 2 and 0.1 microns with a median or average particle size of 0.4 microns, pH 4.5).

Each compound was then mixed in a Crown Compounding extruder operated at a screw speed of 150 rpm at 15 amps; a melt temperature of 568±10° F. and eight temperature zones from the inlet to the outlet of 637, 578, 596, 598, 590, 591, 589 and 592° F.,±10° F. respectively. A die temperature of 605° F. was maintained. The die extruded ⅛" strands of plastic which were cut by a hot face rotating blade pelletizer. The pellets were subsequently fed to a 75 ton Newbury injection molding extruder. Operation of the extruder results in encapsulation of metal inserts (leads) with the thermoplastic compound.

The injection mold on a shuttle table attachment was a vertical operation type which allows for the positioning of metal inserts within the mold. The injection molding extruder was a 3 zone barrel system. The zone 1 temperature operated at 675° F., zone 2 operated at 650° F., and zone 3 operated at 600° F. The nozzle temperature was 675° F. and the mold temperature was 300° F. The encapsulated devices consisted of a rectangular package of poly(arylene sulfide) blend similar to conventional integrated circuit packages having two copper leads extending out of each opposing longer side of the package. The leads were secured in an Instron Universal tester Model 1125 operated to measure the tensile strength in psi by pulling the leads from the package. Four (4) devices having varying lead configurations for each composition were made and tested. The results in table one show the improvement in pull out strength and thus sealing characterstics.

TABLE 1

| | Tensile Strength in psi | | |
|---|---|---|---|
| | Blend 1 | Blend 2 | Blend 3 |
| Long rectangular lead | 55 | 62.9 | 49.6 package destroyed |
| Short rectangular lead | 31.5 | 44.9 | 39.7 package destroyed |
| Long tapered lead | 39.7 | 47.9 | 44.7 package destroyed |
| Short tapered lead | 28.6 | 33.3 | 36.1 |

As seen in the table, the addition of 31.3% fume silica resulted in an increase of 13.6% in pull out strength. Pull out strength is also an indicator of resin sealing properties indicating the encapsulated package's moisture imperviousness. With the addition of 62.6% silica fume, replacing all the fused silica, in all but one trial the pull out strength exceeded the molded resins strength resulting in package destruction before lead separation. After destruction it was observed that part of the resin package was still attached to the leads. The one package not destroyed showed an increase of 26% over fused silica.

It should be noted that package strengthwas sacrificed for increased sealing characteristics in encapsulation applications since the sealing property for encapsulated electronic devices determine their operating environment.

It should also be noted that fumed silica of bulk density less than 5 lb/cu. ft. could not be compounded into poly(arylene sulfide) in significant quantities to be tested according to Example I. It is believed that this problem arises from the fact that the bulk density of fumed silica is below 5 pounds per cubic foot.

EXAMPLE II

The following were preblended and mixed in a Henchel high intensity Mixer, and identified as Blend A; 15 weight percent Fiberglass (fiberglass from Owens Corning, Amarillo, Tex. identified as grade 497), 0.25 weight percent high density polyethylene (HDPE from Phillips Chemical Company identified as Marlex DX605), 0.5 weight percent silane (3-mercaptopropyltrimethoxysilane from Union Carbide identified as A-189), 48.25 weight percent calcium sulfate ($CaSO_4$ from US Gypsum identified as CA5, average particle size of about 1.5 microns), 1 weight percent Hydrotalcite (magnesium aluminum hydroxy carbonate hydrate from Kyowa Chemical Ind. Co. Ltd identified as DHT-4A) and 35 weight percent of a cured neat poly(phenylene sulfide) made according to the general procedure as disclosed in U.S. Pat. No. 3,354,129 (Extrusion rate in the range of 20 to 30 grams per 10 minutes as determined by Ryton® analytical method 7914-B22 published by Phillips Petroleum Company, Apr. 12, 1979, revised Aug. 18, 1982).

The 2nd composition, identified as Blend B is the same as blend A above in Blend A except replaces the 48.25 weight percent calcium sulfate with 48.25 weight percent silica fume (Fumed Amorphous Silica from Reynolds Metal Company, Little Rock, Ark. identified as RS-1, bulk density 21 lb/cu. ft., particle size distribution between about 2 and 0.1 microns with a median or average particle size of 0.4 microns, pH 4.5).

Each compound was then melt mixed in a Crown Compounding extruder operated at a screw speed of 125 rpm at 40 amps; a melt temperature of 601±40° F. and 8 temperature zones from the inlet to the outlet of 620, 650, 630, 610, 625, 600, 600 and 605, ±10° F. respectively. The die extruded ⅛" strands of plastic which were cut by a hot face rotating blade pelletizer. The pellets were subsequently fed to a 75 ton Newbury injection molding extruder.

The injection molding extruder was operated at 700 psi injection pressure and 50% injection rate. The stock temperature was 625° F. and the mold temperature was 300° F. The resin was injected into a polished mold. The molded devices consisted of flat rectangular plaques.

The molding devices were tested for surface smoothness by profiling the surface using a profilometer (Alpha Step by Tencor Instruments). This test consisted of moving a mechanical stylus (similar to a phonograph needle) across the surface. The length of the movement for a single scan is 3 millimeters and requires 10 seconds. The results of the profilometer test (an indicator of surface smoothness) are shown in FIG. 1. All conditions, such as chart speed, were identical for both scans, only the additive was changed. FIG. 1 shows that the Blend A control polymer, with calcium sulfate, exhibits a rough contour where as Blend B invention polymer, with silica fume, shows significant reduction in contour deformation and thus improved surface smoothness.

EXAMPLE III

The following were preblended and mixed in a Henchel high intensity Mixer, and identified as Blend I; 35 weight percent Fiberglass (fiberglass from Owens Corning, Amarillo, Tex. identified as grade 497), 0.25 weight percent high density polyethylene (HDPE from Phillips Chemical Company identified as Marlex EMN-TR885), 25.25 weight percent calcium sulfate (CaSO4 from US Gypsum identified as CA5), 1.5 weight percent Hydrotalcite (magnesium aluminum hydroxy carbonate hydrate from Kyowa Chemical Ind. Co. Ltd identified as DHT-4A) and 38 weight percent of a cured neat poly(phenylene sulfide) as described in Blend A in Example II above.

The 2nd composition, identified as Blend II uses Blend I as above except replaces the 25.25 weight percent calcium sulfate with 25.25 weight percent silica fume (Fumed Amorphous Silica from Reynolds Metal Company, Little Rock, Ark. identified as RS-1, bulk density 21 lb/cu. ft., particle size distribution between about 2 and 0.1 microns with a median or average particle size of 0.4 microns, pH 4.5).

Each compound was then melt mixed in a Crown Compounding extruder operated at a screw speed of 100 rpm at 30 amps; a melt temperature of 610±40° F. and 8 temperature zones from the inlet to the outlet of 650, 650, 640, 615, 620, 610, 620 and 620, ±40° F. respectively. A die temperature of 685° F. was maintained. A die extruded ⅛" strands of plastic which were cut by a hot face rotating blade pelletizer. The pellets were subsequently fed to a 75 ton Newbury injection molding extruder. Operation of the extruder results in encapsulation of metal inserts with the thermoplastic compound.

The injection mold on a shuttle table attachment was a vertical operation type which allows for the positioning of metal inserts within the mold. The injection molding extruder was a 3 zone barrel system. The zone 1 temperature operated at 650° F., zone 2 operated at 625° F., and zone 3 operated at 600° F. The nozzle temperature was 640° F. and the mold temperature was 300° F. The encapsulated devices consisted of a 3" diameter simulated capacitor top thick circular element (disc) with two metallic cylindrical inserts positioned centrally on the element. The devices were sealed to a single open end canister which was pressured up to test leakage around the inserts. Application of an alcohol solution followed by visual observation of bubble formation was used to assign a pass (no leak); fail (leak) rating to each composition. In all cases tested, the device encapsulated with Blend I (control) leaked profusely whereas in all cases the devices encapsulated with Blend II (invention) did not leak.

That which is claimed is:

1. A polymer composition comprising:
poly(arylene sulfide) and an amount of silica fume sufficient to improve at least one property selected from the group consisting of surface smoothness and adhesion to metal, wherein the bulk density of said silica fume is within the range of 5 to 50 pounds per cubic foot, said silica fume being produced by vaporizing quartz.

2. A composition according to claim 1, wherein said polymer composition contains at least one other material selected from the group consisting of fillers, reinforcements, processing aids, flow improvers, and pigments.

3. The composition according to claim 1, wherein said polymer composition contains at least one other material selected from the group consisting of talc, silica, clay, alumina, metal sulfates, metal carbonates, metal oxides, metal hydroxides, mica, diatomaceous earth, inorganic fibers, and carbon black.

4. The composition according to claim 3, wherein said inorganic fibers are selected from the group consisting of asbestos, glass fibers, and carbon fibers.

5. The composition according to claim 3, wherein said metal oxides are selected from the group consisting of titanium dioxide, aluminum oxide, zinc oxide, iron oxide, and chromium oxide.

6. The composition according to claim 3, wherein said metal carbonates are selected from the group consisting of calcium carbonate, magnesium carbonate, and zinc carbonate.

7. The composition according to claim 1, wherein said silica fume has a median particle size of about 0.4 microns.

8. The composition according to claim 1, wherein said silica fume has a bulk density of about 10 to 30 pounds per cubic foot.

9. The composition according to claim 1, wherein the concentration of said silica fume is within the range of about 15 to 70 weight percent based on the total weight of the composition.

10. The composition according to claim 1, wherein said silica fume contains about 98% $SiO_2$, 1% carbon, 0.01% Fe$_2$O$_3$, 0.1% CaO, 0.1% Al$_2$O$_3$, 0.2% MgO, 0.01% MnO, 0.04% PbO, 0.3% K, 0.1% Na, and 0.05% S.

11. The polymer composition according to claim 1, wherein said poly(arylene sulfide) is represented by repeating units of the structural formula:

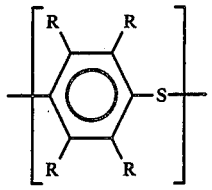

wherein R is selected from the group consisting of hydrogen and alkyl radicals having 1 to 4 carbon atoms.

12. The polymer composition according to claim 9, wherein said poly(arylene sulfide) contains units of the structural formula:

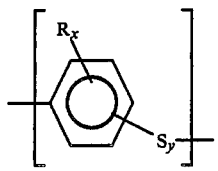

wherein R is selected from the group consisting of hydrogen and alkyl radicals having 1 to 4 carbon atoms, x is $\leq 3$, y is $\geq 2$, and $x+y=5$.

13. The polymer composition according to claim 11, wherein said poly(arylene sulfide) is poly(phenylene sulfide).

14. A process for improving the surface smoothness and adhesion to metal of compositions comprising polymers of arylene sulfides which comprises the addition of silica fume in an amount sufficient to improve at least one property selected from the group consisting of surface smoothness and adhesion to metal wherein the bulk density of said silica fume is within the range of 5 to 50 pounds per cubic foot, said silica fume being produced by vaporizing quartz.

15. The process according to claim 14, wherein said silica fume is in the concentration range of about 15–70 weight percent based on the total weight of the composition.

16. The process according to claim 14, wherein about 5 to 40 weight percent of the total composition is reinforcing inorganic fiber selected from the group consisting of asbestos, glass, and carbon.

17. The process according to claim 14, wherein said silica fume is compounded with said polymers.

18. A process for producing molded articles which comprises:
(a) supplying to a mold a measured amount of a thermoplastic material comprising poly(arylene sulfide) and silica fume wherein the amount of said silica fume is sufficient to improve at least one property selected from the group consisting of surface smoothness and adhesion to metal and the bulk density of said silica fume is within the range of 5 to 50 pounds per cubic foot, said silica fume being produced by vaporizing quartz;
(b) heating the mold to fuse the powdered thermoplastic material; and
(c) cooling the mold to cause the fused thermoplastic material to solidify resulting in a molded article of improved properties.

19. The process according to claim 18, wherein said thermoplastic material was compounded and pelletized prior to said supplying to a mold.

20. The process according to claim 19, wherein said thermoplastic material was compounded by melt mixing.

21. A process for producing molded articles which comprises:
(a) supplying to a mold a measured amount of a molten thermoplastic material comprising poly(arylene sulfide), and silica fume wherein the amount of a said silica fume is sufficient to improve at least one property selected from the group consisting of surface smoothness and adhesion to metal and the bulk density of said silica fume is within the range of 5 to 50 pounds per cubic foot, said silica fume being produced by vaporizing quartz; and
(b) cooling the mold to cause the molten thermoplastic material to solidify resulting in a molded article of improved properties.

22. The process according to claim 21, wherein said molten thermoplastic material is injected into said mold.

23. The process according to claim 22, wherein said mold contains at least one electrical element.

24. A process for coating substrates which comprises:
(a) supplying to a substrate an amount of molten thermoplastic material comprising poly(arylene sulfide), and silica fume wherein the amount of said silica fume is sufficient to improve at least one property selected from the group consisting of surface smoothness and adhesion to metal and the bulk density of said silica fume is within the range of 5 to 50 pounds per cubic foot, said silica fume being produced by vaporizing quartz; and
(b) cooling the subtrate to cause the molten thermoplastic material to solidify resulting in a coated substrate of improved properties.

25. The process according to claim 24, wherein said thermoplastic material is supplied to said substrate as a pelletized thermoplastic material which is then melted to form said molten thermoplastic material.

26. The process according to claim 25, wherein said pelletized thermoplastic material was mixed prior to being supplied to said substrate.

27. The process according to claim 24, wherein said substrate is metallic.

28. An article of manufacture comprising a molded article of improved surface smoothness made with a composition of claim 1.

29. A polymer composition comprising:
poly(arylene sulfide) and an amount of silica fume containing about 98% SiO$_2$, 1% carbon, 0.01% Fe$_2$O$_3$, 0.1%, CaO, 0.1% Al$_2$O$_3$, 0.2% MgO, 0.1% MnO, 0.04% PbO, 0.3% K 0.01% Na and 0.05% S, sufficient to improve at least one property of said polymer selected from the group consisting of surface smoothness and adhesion to metal; wherein the bulk density of said silica fume is within the range of 5 to 50 pounds per cubic foot, the particle size of said silica fume is within the range of 0.01 to 10 microns, and said silica fume is present in said polymer composition in an amount within the range of about 15 to about 70 weight percent silica fume based on the total weight of said polymer composition.

* * * * *